United States Patent [19]
Orimo et al.

[11] Patent Number: 5,506,962
[45] Date of Patent: Apr. 9, 1996

[54] DISTRIBUTED PROCESSING SYSTEM AND METHOD FOR JOB EXECUTION USING A PLURALITY OF PROCESSORS AND INCLUDING IDENTIFICATION OF REPLICATED DATA

[75] Inventors: Masayuki Orimo, Kawasaki; Kinji Mori, Yokohama; Yasuo Suzuki, Ebina; Minoru Koizumi, Yokohama; Katsumi Kawano, Fuchu; Kozo Nakai, Katsuta; Hirokazu Kasashima, Hitachi, all of Japan

[73] Assignee: Hitachi, Ltd., Tokyo, Japan

[21] Appl. No.: 272,755

[22] Filed: Jul. 11, 1994

Related U.S. Application Data

[63] Continuation of Ser. No. 760,349, Sep. 16, 1991, Pat. No. 5,335,324, which is a continuation-in-part of Ser. No. 35,026, Apr. 6, 1987, abandoned, and a continuation-in-part of Ser. No. 940,495, Dec. 10, 1986, Pat. No. 4,797,885, and Ser. No. 895,375, Aug. 11, 1986, Pat. No. 4,803,683.

[30] Foreign Application Priority Data

Apr. 4, 1986 [JP] Japan .................................. 61-76522
Jul. 25, 1986 [JP] Japan .................................. 61-173642

[51] Int. Cl.$^6$ .................................................. G06F 13/38
[52] U.S. Cl. .................. 395/200.03; 364/DIG. 1; 364/229; 364/260; 364/262; 364/264; 364/265; 364/284
[58] Field of Search .................. 364/DIG. 1, DIG. 2; 395/200, 375, 575, 200.03

[56] References Cited

U.S. PATENT DOCUMENTS

| | | | |
|---|---|---|---|
| 4,462,075 | 7/1984 | Mori et al. ............................ | 364/200 |
| 4,503,499 | 3/1985 | Mason et al. ......................... | 364/200 |
| 4,530,051 | 7/1985 | Johnson et al. ....................... | 364/200 |
| 4,653,048 | 3/1987 | Anderson et al. ..................... | 370/94 |
| 4,825,354 | 4/1989 | Agrawal et al. ...................... | 364/200 |
| 5,335,324 | 8/1994 | Orimo et al. ......................... | 395/200 |

Primary Examiner—Thomas G. Black
Assistant Examiner—Maria N. Von Buhr
Attorney, Agent, or Firm—Antonelli, Terry, Stout & Kraus

[57] ABSTRACT

A distributed processing method and system including a plurality of processors connected via a transmission path, in which a function is provided to an arbitrary processor to receive information and data passing through the transmission path and to obtain the received data based on information indicating input/output relationships between modules corresponding to the association of processing between the modules. When required, necessary portions of the obtained information and logging results are extracted, so that not only the time series data log but also the information or data log can be collected corresponding to the flow of a sequence of processing by establishing a display or print-out module. Furthermore, when data is received from an external device, the system generates a message having information indicating the order of the data and the content code representing content of the data and sends the message to the transmission path. A processor receives messages from the transmission path, and stores the data in accordance with each content code in an order which facilitates trouble shooting of the system.

26 Claims, 15 Drawing Sheets

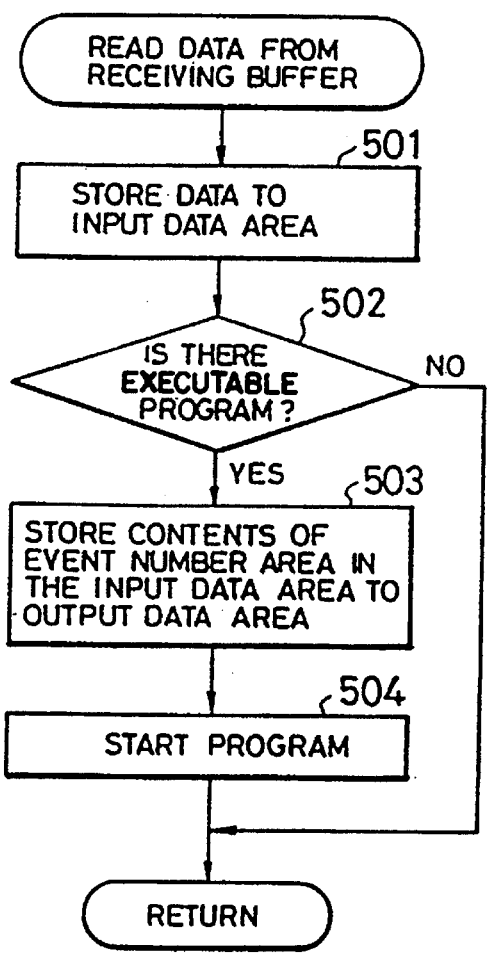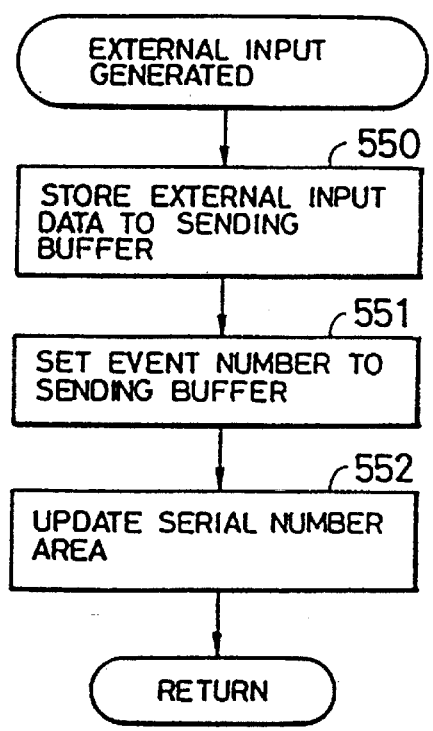
FIG. 5(a)
FIG. 5(b)

FIG. 11(a)
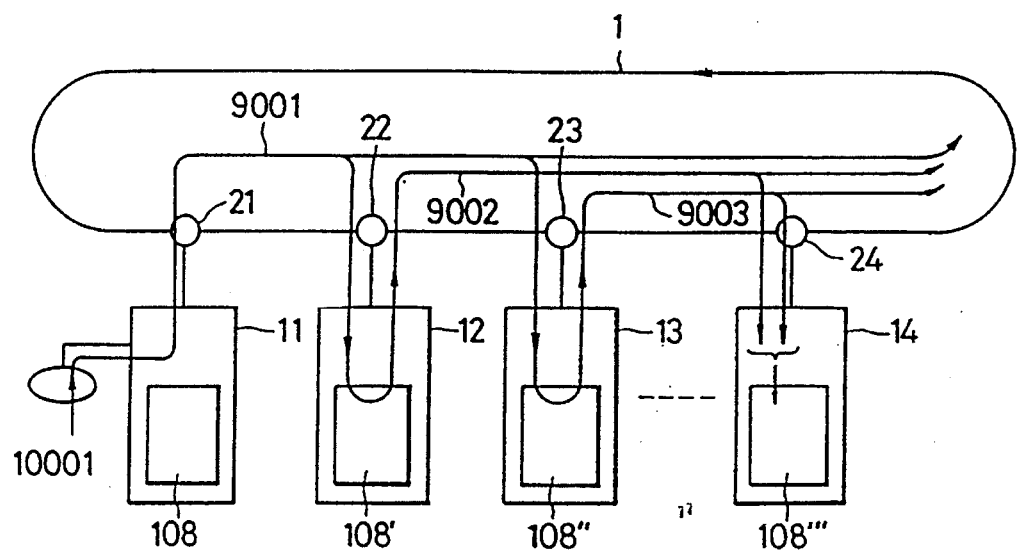
FIG. 11(b)
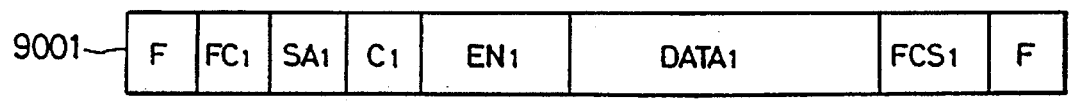
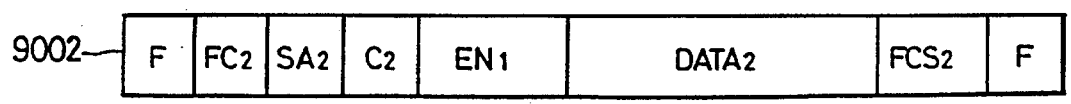
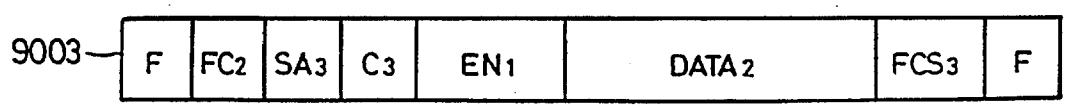

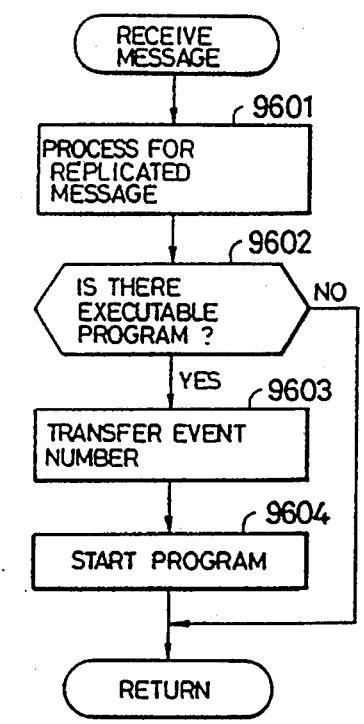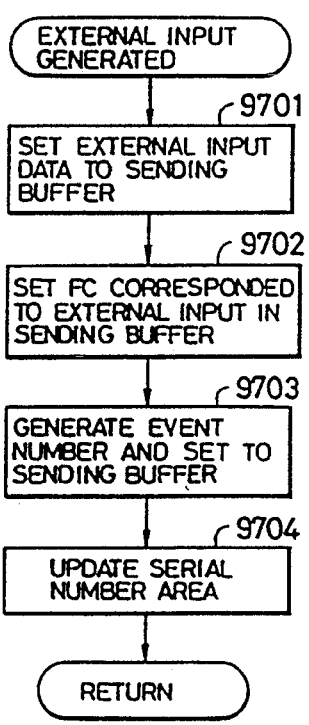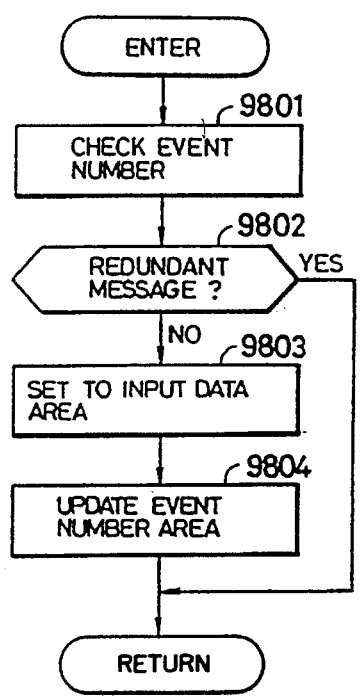

DISTRIBUTED PROCESSING SYSTEM AND METHOD FOR JOB EXECUTION USING A PLURALITY OF PROCESSORS AND INCLUDING IDENTIFICATION OF REPLICATED DATA

This is a continuation of our U.S. application Ser. No. 07/760,349, filed Sep. 16, 1991 now U.S. Pat. No. 5,335,324 which was a continuation-in-part of our U.S. application Ser. No. 07/035,026, filed Apr. 6, 1987 and now abandoned; and a continuation-in-part of our U.S. application Ser. No. 06/940,495, filed Dec. 10, 1986, now U.S. Pat. No. 4,797,885, and our U.S. application. Ser. No. 06/895,375, filed Aug. 11, 1986, now U.S. Pat. No. 4,803,683.

BACKGROUND OF THE INVENTION

Field of the Invention

The present invention relates to a distributed processing system and a method of distributed processing for executing a sequence of processing steps in a distributed fashion by use of a plurality of processors for effectively performing troubleshooting and for making it possible to identify replicated data belonging to the same processing.

In the U.S. Pat. No. 4,627,055 assigned to the same assignee as the present application, there has been described a distributed processing method for executing a sequence of processing steps in a distributed manner by use of a plurality of processors connected via transmission lines. In the patented system programs are distributed to and stored in respective processors to execute the respective portions of a sequence of processing steps and an initiation of a program of each processor is conducted when all data necessary to execute the program is completely received via a transmission line into the pertinent processor. Although this method makes it possible to achieve a sequence of processing steps through a distributed processing in the respective processors each effecting an execution of a portion of the processing steps without requiring the use to a control processor for controlling the overall system, there is not provided means for collecting the operation history of the system necessary at an occurrence of an abnormality to analyze (to conduct a troubleshooting) the cause of the abnormality and hence there arises a problem with respect to the maintainability of the system.

While some conventional operating systems (OS's) have a function to collect the operation history of the system in some cases, the objective of such data collection includes only the operation history in the processor in which the pertinent OS is loaded, which is insufficient to accomplish the troubleshooting in a distributed processing system for executing a sequence of processing steps in a distributed manner by use of a plurality of processors.

The Japanese Utility Model Laid-open No. 57-175238 discloses a method in which when there exist a plurality of processors for executing the same processing, in place of the operation to select a truth value by use of a voter from the respective processing execution results of the processors to send only the truth value to the transmission network, the processing execution results are sent to the transmission network without any operations conducted thereon and each processor on the receiving side selects from the messages on the network the message belonging to the same processing operation for the pertinent processor so as to select a truth value in the processor on the receiving side according to a majority decision logic. According to this method, messages having the same content code (indicating the content of the data) are collected for a fixed period of time to count the number of messages thus collected and based on the result of the count, the truth value is judged according to the majority decision logic. The invention described above provides a flexible voting method which avoids the predecision to beforehand determine a processor from which an output is to be received into the voter.

In the prior art technology, there is used a method in which a message which is transmitted on a transmission medium includes a code indicating the content thereof and the messages for which the code matches a stored code are collected by a processor as messages belonging to the same process for a period of time from the collected messages according to a majority decision logic. In this method, however, since the messages belonging to the same processing are identified only by the code indicating the content of each of the messages, when a processor for executing the same process is initiated by a different trigger during a short period of time less than the period of time for collecting the messages, there arises a problem that an output message associated with the different trigger cannot be identified.

SUMMARY OF THE INVENTION

It is therefore an object of the present invention to provide a distributed processing system and a method of the same in a system operating in a distributed fashion respective processors of a sequence of processing operations by use of corresponding processors without requiring the use of a control processor to control the overall system for effectively achieving the troubleshooting and for making it possible to identify replicated data belonging to the same processing.

To achieve this object, according to the present invention, the distributed processing system for operating in a distributed fashion a sequence of processing operations of a job by use of a plurality of processors connected via transmission paths includes sending to the transmission path information with a content code assigned by a processor associated with the distributed processing, receiving into a processor the information flowing through the transmission path together with the content code of the information, and establishing a relationship between the stored data stored for each content code and a program in each processor so as to obtain information corresponding to the flow of a sequence of processing step. Moreover, it is characteristic of the present invention to compare an event number of the received message with an event number of the previously received message, thereby detecting replicated messages belonging to the same processing.

BRIEF DESCRIPTION OF THE DRAWINGS

The present invention will be apparent from the following detailed description taken in conjunction with the accompanying drawings in which;

FIGS. 5(a)–5(b) are diagrams showing flowcharts of operations according to the present invention;

FIGS. 11(a)–11(b) are explanatory operation diagrams showing the overall operation flow according to the present invention;

FIGS. 15–18 are flowcharts illustrating processing flows in each processor according to the present invention.

DETAILED DESCRIPTION OF THE PREFERRED EMBODIMENTS

[First embodiment]

Figure 1:
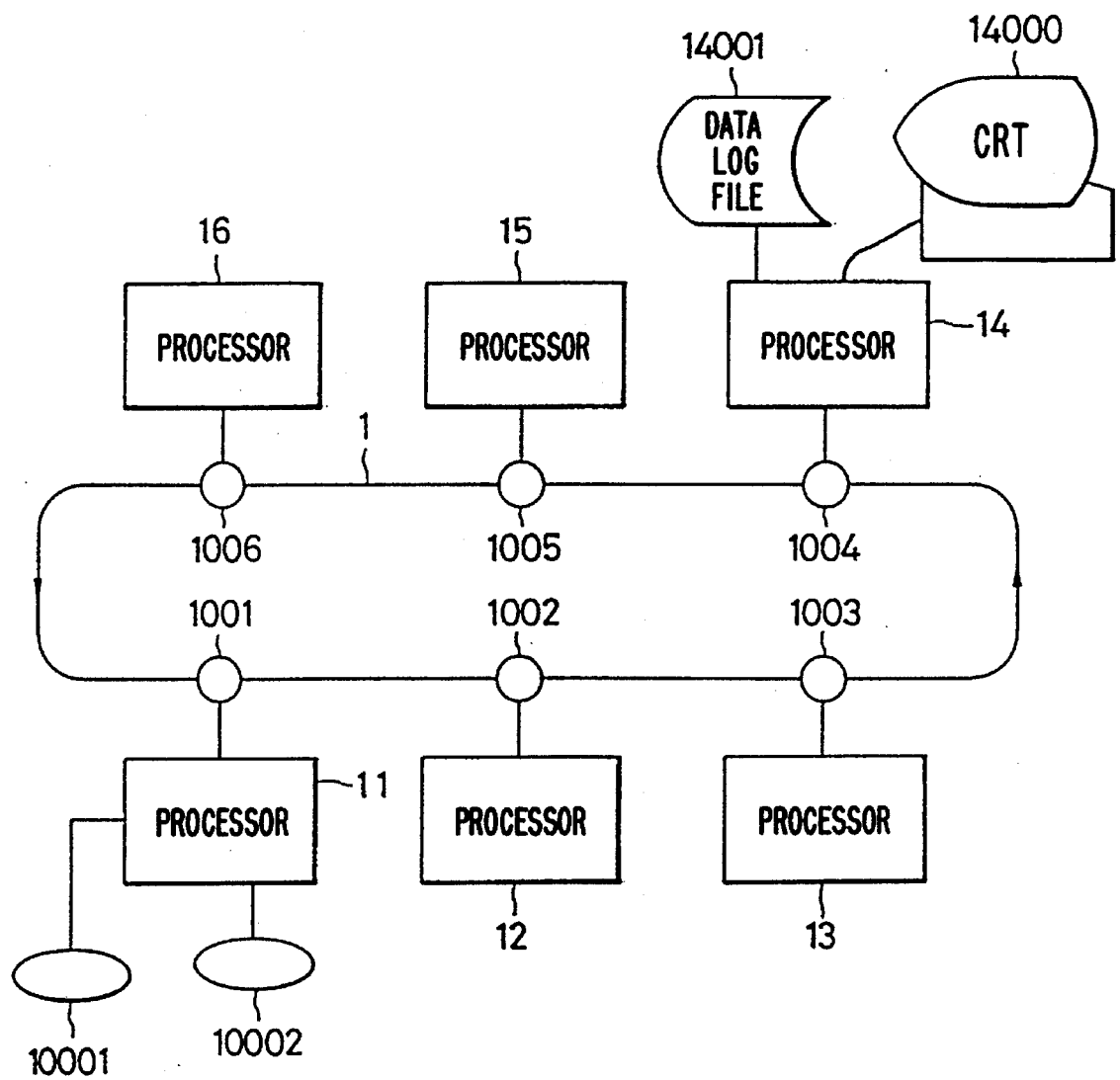
FIG. 1 is a schematic block diagram showing a system configuration of an embodiment of the present invention.

A first embodiment of the present invention will be described in detail with reference to the accompanying drawings. FIG. 1 is an overall configuration diagram of a system of the first embodiment. In the following embodiment, although the transmission path connecting the respective processors is described as a loop transmission line system as an example, the processing is the same even in a network in which any other transmission medium or a non-loop configuration is used.

The system of FIG. 1 includes processors 11– 16 each storing in a memory thereof an application program to be executed and a unidirectional loop transmission line 1 enabling unidirectional transmission of messages. Reference numerals 1001–1006 indicate network control processors (NCP's) for controlling data transmission on the transmission line. The NCP's 1001– 1006 and the processors 11–16 are bidirectionally connected to each other. The processing results (data) of the processors 11–16 are sent via the NCP's 1001– 1006 to the transmission line 1. The NCP's 1001–1006 each judge whether or not the data flowing through the transmission line 1 is necessary for the processor connected thereto. Only when the data is judged to be necessary, the data be sent to the processor connected to the NCP. The processors 11–16 each start the application program stored therein when the data necessary for the execution of the application program has been completely gathered. The started program executes its processing by use of the received data.

In this embodiment, it is assumed that the data logging operation of the present invention is accomplished by the processor 14 and hence a CRT console 14000 and a data log file 14001 are connected to the processor 14. Moreover, an external input device 10001 and an external output device 10002 are connected to the processor 11, so that data is obtained from an external process via the external input device 10001 and data is delivered to an external process via the external output device 10002.

Figure 2:
FIG. 2 and FIG. 10(a) are diagrams illustrating message formats of messages transmitted in the embodiment.

FIG. 2 shows the format of a data message passing through the transmission line 1. A content code FC 202 is a code corresponding to the content or function of the message data. Each NCP examines the content code to determine whether or not the received data is necessary for the processor connected to the NCP. SA 203 indicates an address of an NCP that has sent data (source address), whereas C 204 is a serial number necessary for the transmission. Data 206 is an application program, FCS 207 indicates data for an error detection, and F 201 and F 208 are flags indicating the beginning and ending of the message, respectively. Futhermore, EN 205 is a serial number of the processing level and comprises a processor number and a data generation serial number, which is referred to as an event number herebelow.

Figure 3:
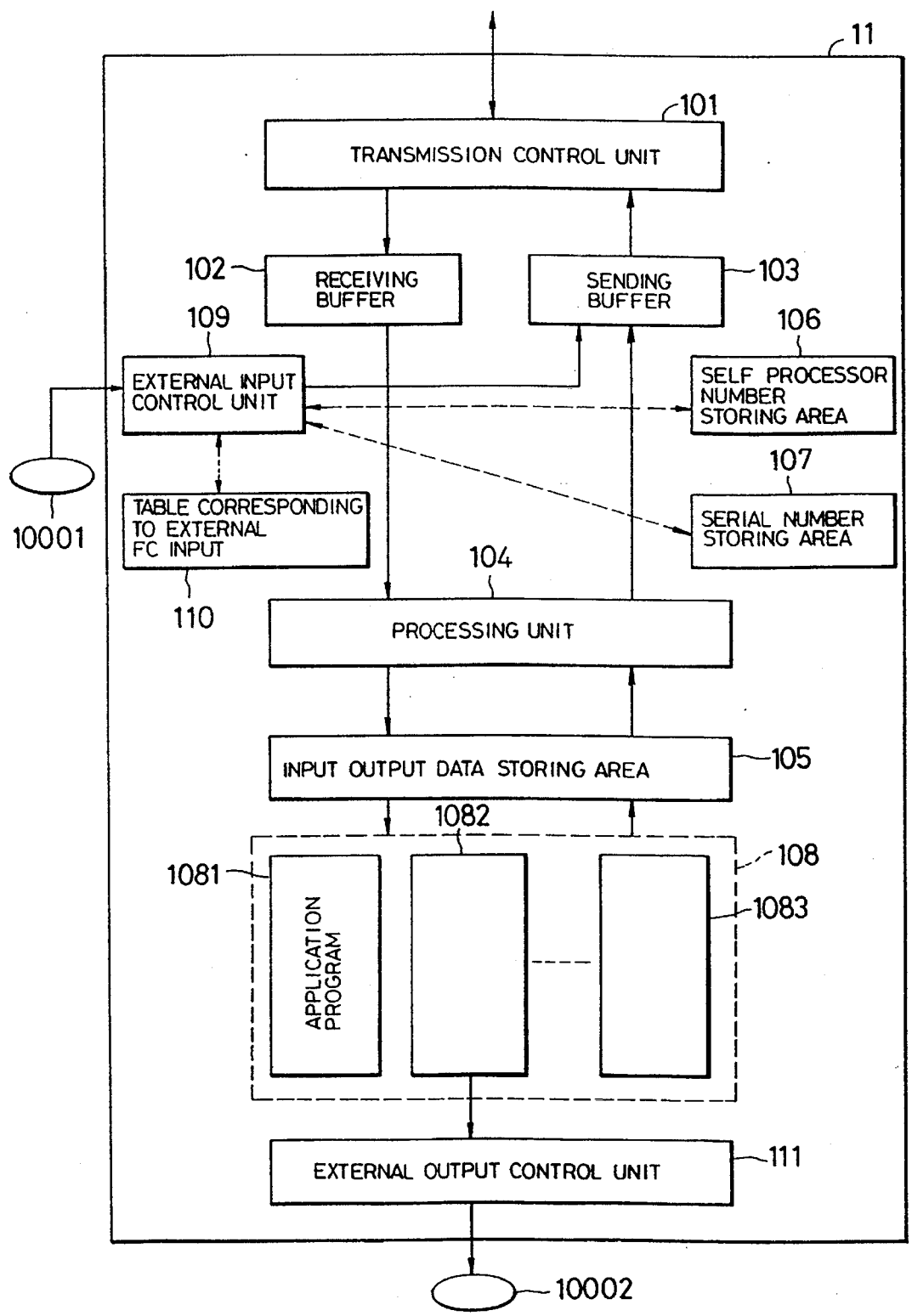
FIG. 3 is a are schematic diagram depicting a configuration of a processor according to the present invention.

FIG. 3 is a schematic diagram showing an internal configuration of the processor 11 of FIG. 1. The processors 12–16 are also of the same configuration. A transmission control unit 101 is used to achieve a data transfer between the NCP 1001 and the processor 11, and the data received from the NCP 1001 is stored in the receiving buffer 102. When the data is sent from the sending buffer 103 to the NCP, the data can be simultaneously also received in the receiving buffer 102 in the case where the data in the sending send buffer 103 is necessary for the application program in that processor. The processing unit 104 is used to control execution of the application programs 1081–1083 in the application program area 108. The processor number store area 106 is an area to store the number uniquely assigned to each processor, whereas the serial number area 107 is used as a data generation number counter. Furthermore, the external input control unit 109 is a unit to receive therein an input from the external device 10001. In addition, the external input FC corresponding table 110 is an area to store the content code of the external input data. The input/output data storing area 105 is used to store input/output data for each application program. The external output control unit 111 is disposed to provide an interface between the processor 11 and the external output device 10002, thereby outputting data to the external output device 10002.

Figure 4A:
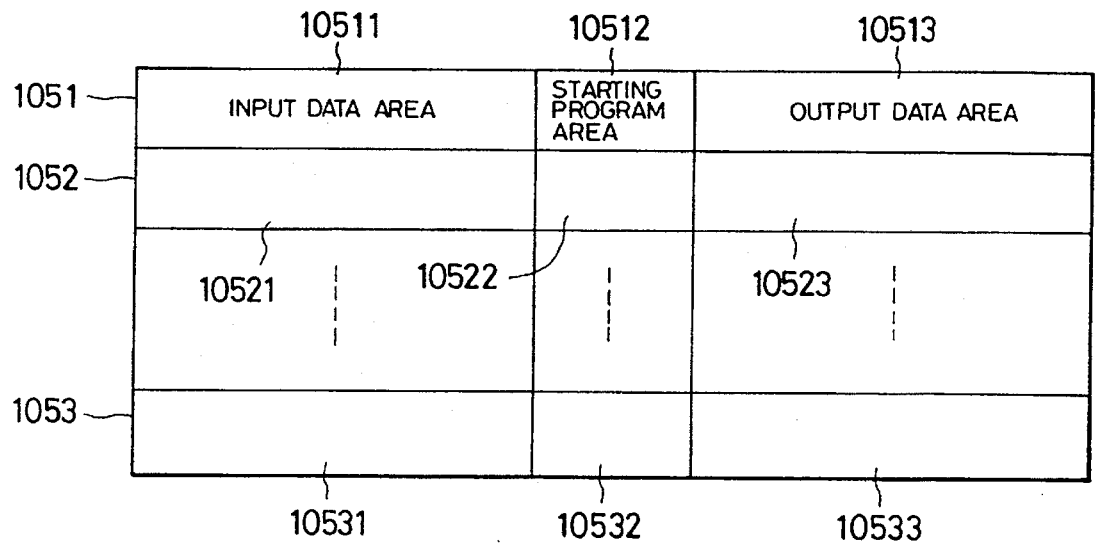
FIGS. 4(a) and 4(b) are diagrams of the input/output data storing area of the processor.

FIG. 4(a) shows the contents of the input/output data storing area 105 of FIG. 3. The 1st row 1051 of the area stores input/output data for the application program 1081, whereas fields 10511 and 10513 store input and output data, respectively.

Moreover, the starting program area 10512 indicates a program (i.e. 1081) to be started by the input data stored in the field 10511. The second row 1052 is used to store therein input/output data for the application program 1082. In the subsequent rows, the input/output data storing areas and the starting program areas are similarly allocated for the respective application programs.

Figure 4B:
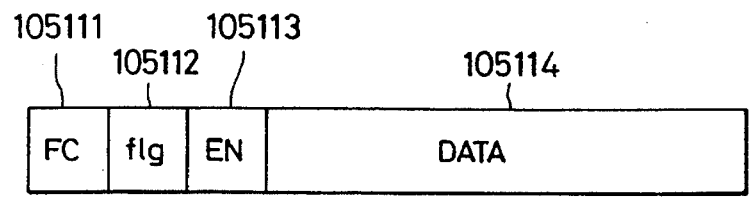

FIG. 4(b) is a schematic diagram illustrating the format of the input/output data storing area 10511 of FIG. 4(a). To an area 105111, a content code of the input data is set in advance. An area 105112 is used for a flag indicating whether or not data has been stored, an area 105113 is disposed to store an event number, and an area 105114 actually stores the data. Furthermore, the output data storing area is also of the same format.

FIG. 5(a) shows the processing content in the processing unit (FIG. 3, 104). Data is fetched from the receiving buffer (FIG. 3, 102) and then the event number (EN) and the data field (DATA) are stored in an input data storing area of the input/output data storing area (FIG. 3, 105) for which the FC set to the input data storing area is matched with the FC of the data (501). Next, the system judges whether or not an executable application program exists, namely, whether or not all input data necessary to execute the application program has been stored in the input data storing area (502).

If this is the case, the content of the event number area (EN) in the input data storing area corresponding to the application program is directly stored in the event number area (EN) of the output data storing area corresponding to the program (503) and the program is executed (504). In this case, for an application program to be initiated by a plurality of input data having different event numbers, there are allocated a predetermined number of event number areas in the output data storing area, so that the event numbers of all input data are stored in the event number areas of the output data storing area. However, in a case where the predetermined number of areas is exceeded, the processing is effected according to a predetermined standard, for example, to delete the event numbers beginning from the oldest event number. In a case where the output data of the application program has been stored in the output data storing area, the event number is set into the sending buffer.

FIG. 5(b) is a schematic diagram showing the processing of the external input control unit (FIG. 3, 109). At an occurrence of an external input, the external input control unit judges the content code of the input data based on the external input FC corresponding table (FIG. 3, 110) and sends to the sending buffer (FIG. 3, 103) the content code judged from the input data content and the external input FC table (550). Next, the content of the processor number area (FIG. 3, 106) and the content of the serial number area (FIG. 3, 107) are set to the event number area in the sending buffer (551). Thereafter, the content of the serial number area is incremented by one (552).

Figure 6A:
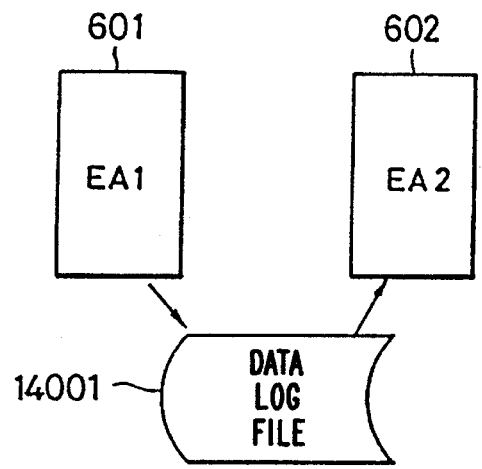
FIGS. 6(a)–8(b) are explanatory diagrams for explaining the process logging method according to the present invention.
Figure 6B:
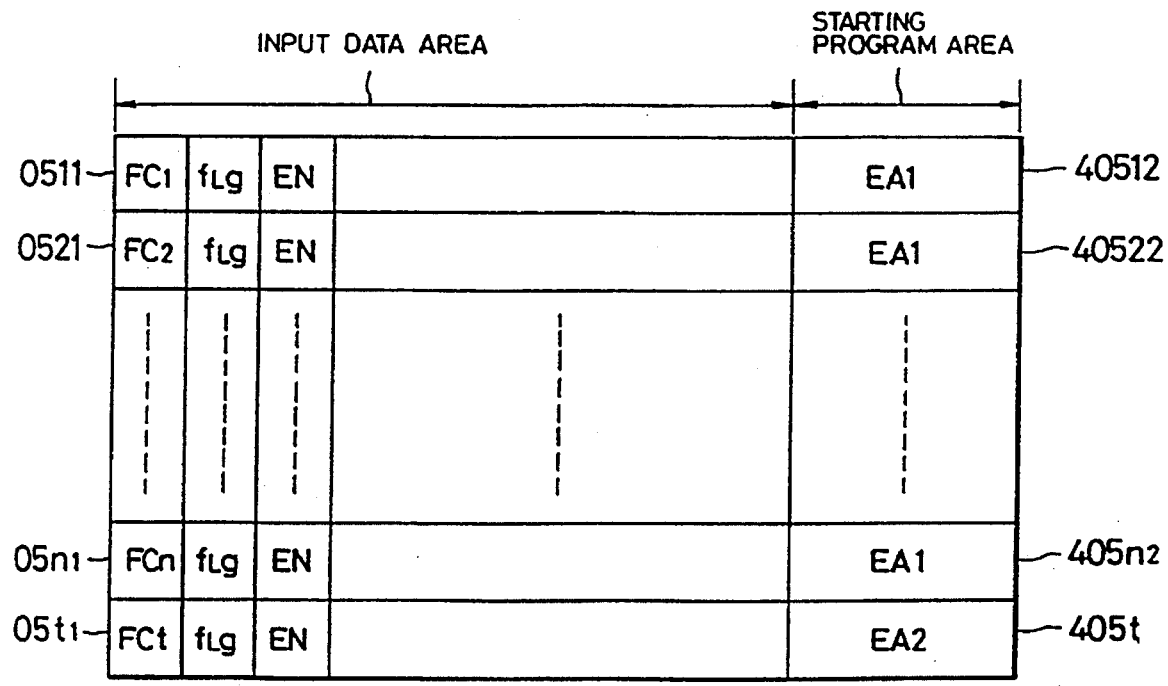

The process logging method of the present invention will be described with reference to FIGS. 6(a)–10(c). FIG. 6(a) shows the configuration of the logging module to be loaded in the processor (FIG. 1, 14). The logging module is constituted from a file 14001 for storing log data, a program EA1 (601) to store log data in the file, and a program EA2 (602) for retrieving data. FIG. 6(b) shows the contents of the input data storing areas (40511–405t1) and the starting program areas (40512–405t2) of input/output data storing areas of processor 14. Since the program EA1 is required to receive and to log the data passing through the transmission line, all content codes ($FC_1$–$FCn$) to be used in the system are set into the input data storing areas 40511–405n1 and the program EA1 is registered in the starting program areas 40512–405n2 corresponding to the content codes, respectively. In addition, the program EA2 is started by the data including a function code $FC_t$ to output the logging results (405t1–405t2).

Next, the processing content of the logging module of FIG. 6(a) will be described with reference to FIGS. 7–10(c).

Figure 7:
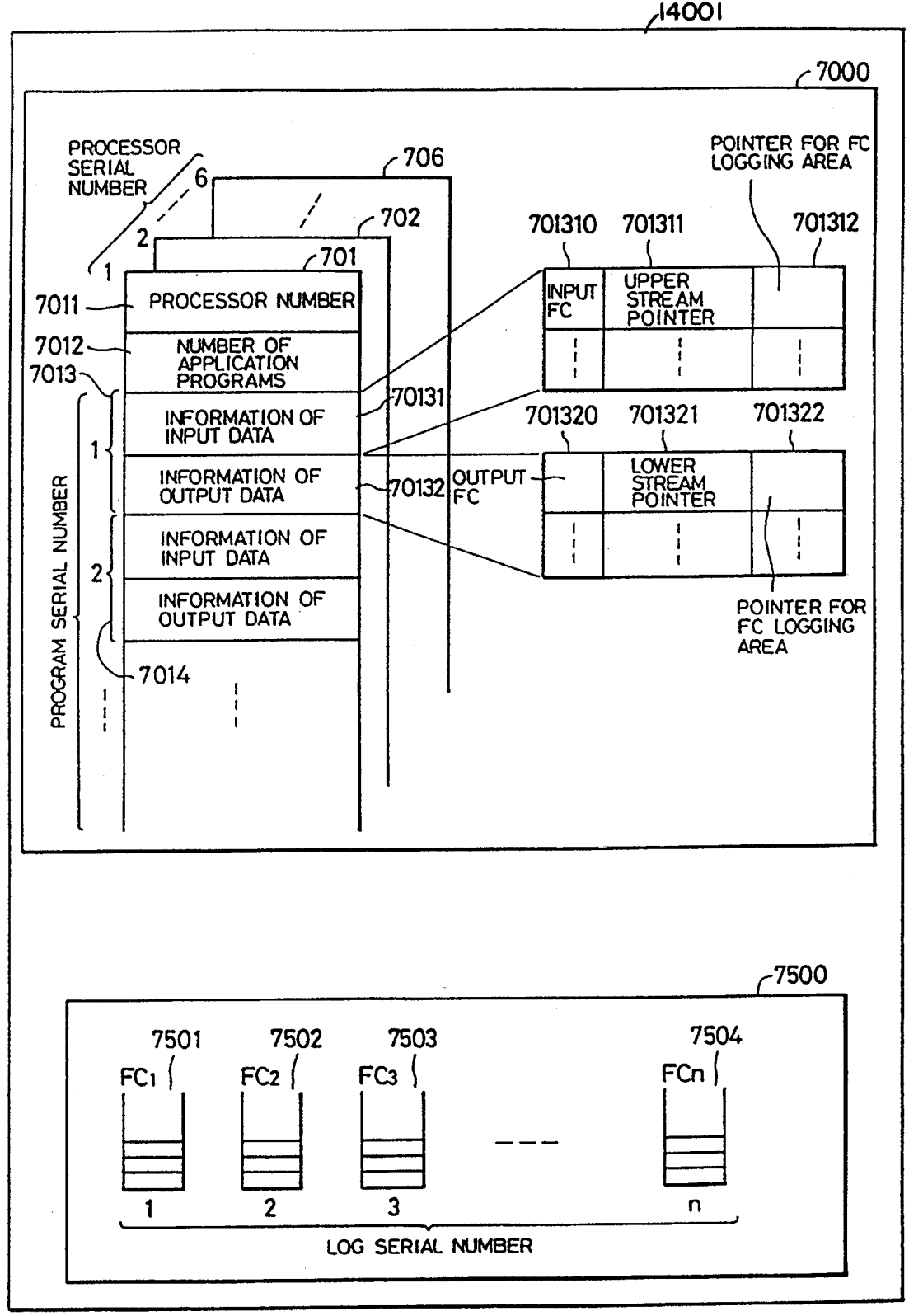

FIG. 7 shows the contents of the data log file 14001 of FIG. 6(a). This file is beforehand initialized as described below. This file comprises a structure table 7000 representing the configuration of the program in the system and a logging area 7500 for each FC. The structure table 7000 indicates application programs set to the respective processors and the input/output relationships between the application programs.

The structure table includes tables 701–706 for the respective processors. The tables 701–706 correspond to the processors (11–16 of FIG. 1, respectively) and are identified by the serial numbers (processor serial numbers) assigned thereto. Next the configuration of the table 701 will be described. Tables 702–706 are also of the same configuration. The table 701 comprises an area 7011 for storing a processor number assigned to the processor 11 (FIG. 1), 7012 for storing the number of programs set to the processor 11, and areas 7013, 7014, etc. for storing the input/output data information for the respective programs. The logging area 7500 is constituted from buffers 7501–750n for storing data for the FC's ($FC_1$–$FCn$) used in the system. Each type is of the cyclic buffer and is assigned with a serial number (log serial number). Next, a description will be given of the contents of the input data information 70131 and the output data information 70132 in the configuration table. The input data information comprises an input FC 701310, an upper stream pointer 701311, and an FC log area pointer 701312. The upper stream pointer indicates a position in the structure table of the program outputting the input FC 701310 and includes a processor serial number and a module serial number indicating a position of an upper stream program. The FC log area pointer 701312 indicates a position of a buffer in which the input FC 701310 is logged, more concretely, a log serial number is set thereto. In addition, the output data information 70132 similarly comprises an output FC 701320, a lower stream program pointer 701321, and an FC log area pointer 701322. Here, the lower stream program pointer 701321 indicates a position in the structure table of the program inputting the output FC 701320 and includes a processor serial number and a module serial number in a similar manner to the case of the upper stream program pointer. With this file, the programs located upstream and downstream of each program, namely, the relationship between the programs can be attained, and at the same time, the log area for the input/output data of each program can be referenced.

Figure 8A:
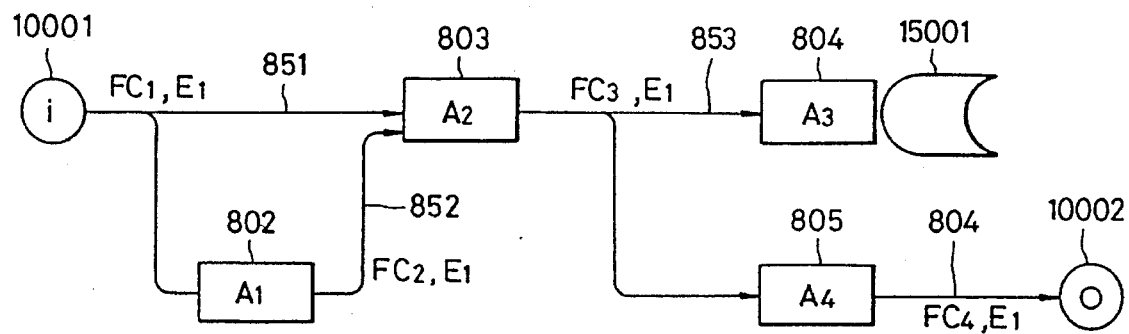
Figure 8B:
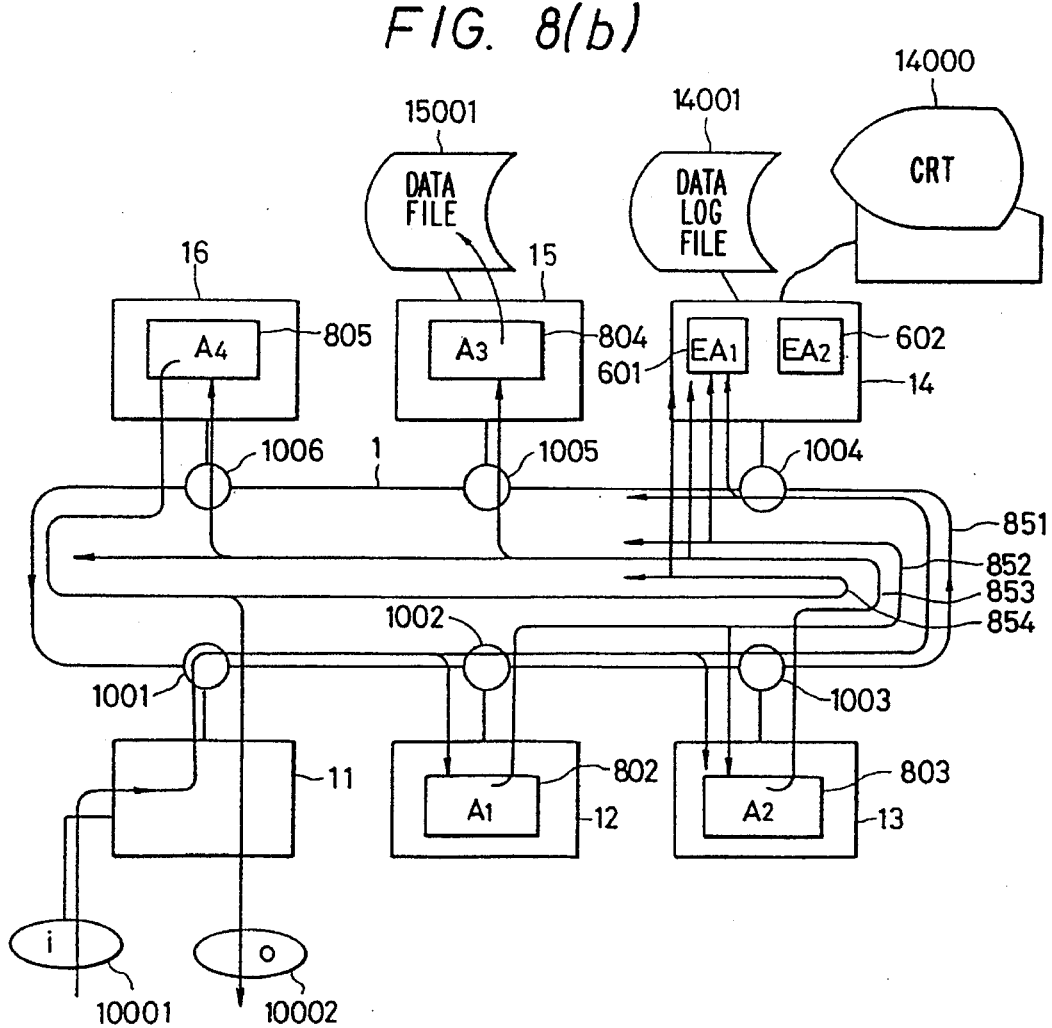

FIGS. 8(a)–8(b) show an example of an application program incorporated in this system. FIG. 8(a) schematically illustrates the relationships between programs. A processor having an input device 10001 outputs data 851 including a content code $FC_1$ and an event number $E_1$, and this data is inputted to program $A_1$ 802 and a program $A_2$ 803. The program $A_1$ processes the data 851 and outputs as a result data 852 including a content code $FC_2$ and an event number $E_1$. The program $A_2$ effects a processing by use of the data 851–852 and outputs data 853 including a content code $FC_3$ and an event number $E_1$. The data 853 is inputted to a program $A_3$ 804 and a program $A_4$ 805. The program $A_3$ stores the input data directly in a file 15001 thereof. The program $A_4$ outputs data 854 including a content code $FC_4$, which is then externally delivered via an output device 10002. FIG. 8(b) shows the actual data flow in a system having this program configuration. Here, the program A1 is executed in the processor 12 of FIG. 1 and the programs $A_2$, $A_3$, and $A_4$ are executed in the processors 13, 15, and 16, respectively. Moreover, the logging programs $EA_1$ and $EA_2$ are executed in the processor 14. In this diagram, the program $EA_1$ is initiated by the data 851–854 flowing through the transmission line and stores each of the data in the log file 14001. Furthermore, the program $EA_2$ outputs, for example, in response to an operator's request from the CRT 14000 the contents of the log file 14001 to the CRT 14000. The processing contents of the programs $EA_1$ and $EA_2$ will be described with reference to FIGS. 9–10(c).

Figure 9:
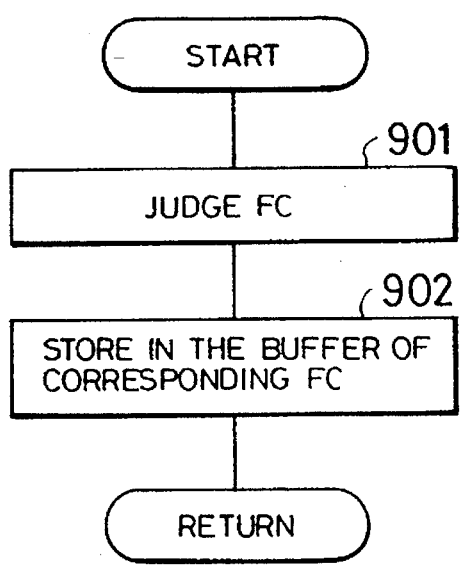
FIGS. 9, 10(a–c) are flowcharts illustrating the processing flows of the process logging module.

FIG. 9 is a schematic diagram showing the contents of the processing of the program $EA_1$ (601 of FIG. 8). When started, the program $EA_1$ judges the content code of the input data (901) and stores the data in a cyclic buffer having a corresponding content code in the logging area (7500 of FIG. 7) (902).

Figure 10A:
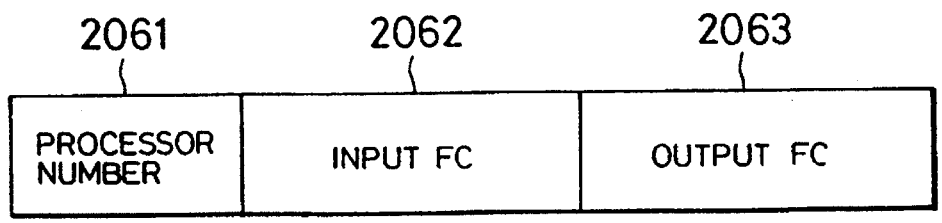
Figure 10B:
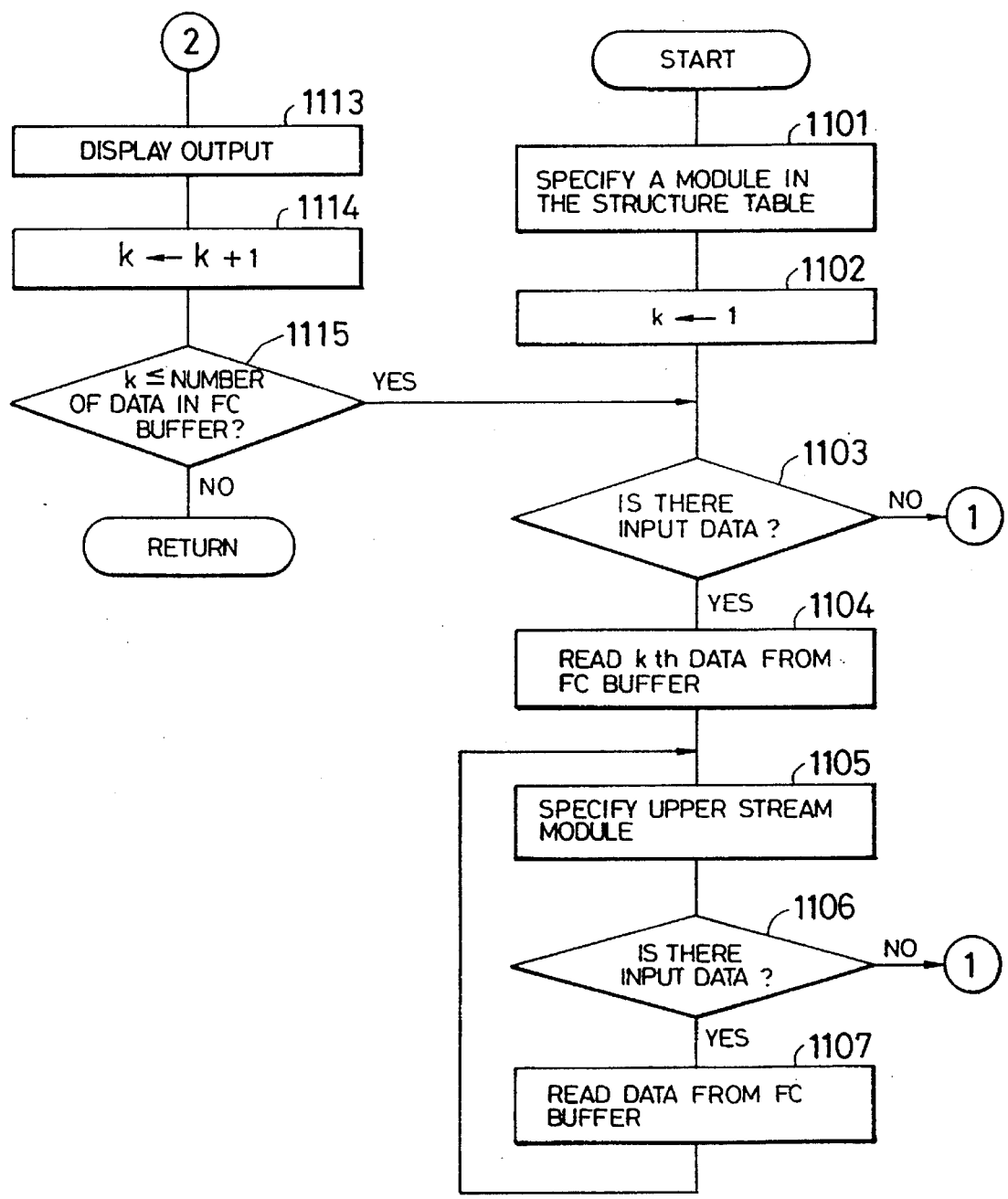
Figure 10C:
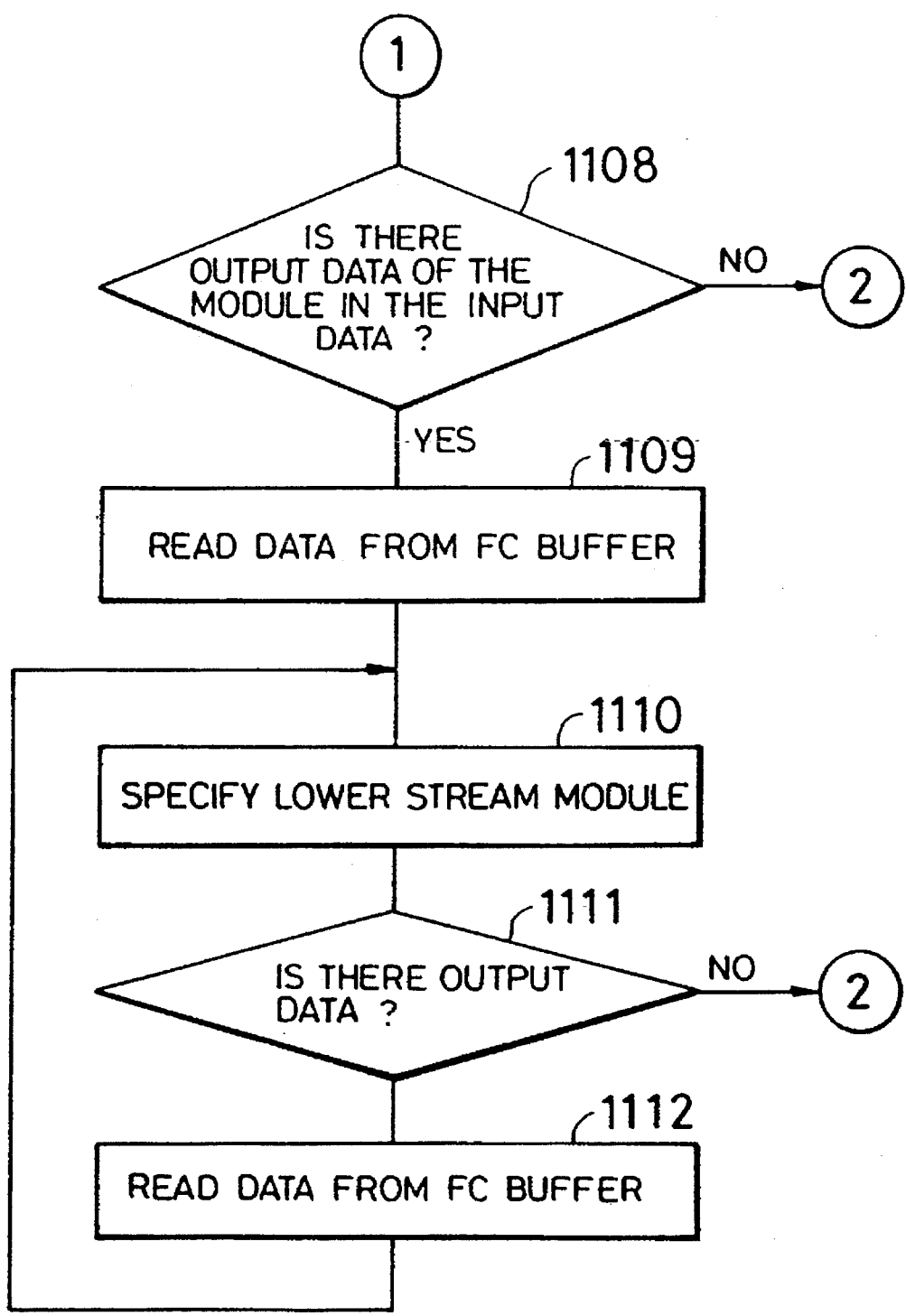

FIGS. 10(a)–10(c) are diagrams illustrating the contents of the processing of the program $EA_2$ (602 of FIG. 8). First, FIG. 10(a) shows the format of the data field (206 of FIG. 2) of the program $EA_2$. The Data field includes a processor number 2061, an input FC 2062, and an output FC 2063 as information to specify a program in the system. FIGS. 10(b)–10(c) are diagrams for explaining the processing of the program $EA_2$. The program $EA_2$ started by the data of FIG. 10(a) first specifies a position in the structure table (FIG. 7, 7000) of the program indicated in the data field of the start data (1101) and sets "1" into the counter k. Next, the program $EA_2$ judges from the structure table whether the input data exists for the specified program at the step 1101 (1103). If the input data exists, the program $EA_2$ fetches into an area the k-th data in the buffer in the FC log area (FIG. 7, 7500) corresponding to the content code of the data (1104). Moreover, a program located upstream with respect to the objective program is specified (1105) and whether or not the input data exists for this program is judged according to the structure table (1106). If the input data exists, data having an event number identical to that of the data fetched in the step 1104 is searched in the buffer in the FC log area corresponding to the content code of the data and obtained data is fetched into an area (1107). The processing steps 1105–1107 are repetitiously executed until a program for which the input data does not exist appears, namely, beginning from the program specified in the start data, the upstream programs are checked to sequentially store the data in the system. When there does not exist input data in the step 1106, control returns to the processing 1108 of FIG. 10(c). Namely, whether or not the output data exists for the program indicated in the start data is judged depending on the structure table. If the output data exists, the data having an event number identical to that of the data fetched in the step 1104 of FIG. 10(b) is searched in the buffer in the FC log area corresponding to the content code of the data and the obtained data is fetched into the area (1109). Furthermore, the program located downstream of the objective program is specified (1110) and whether or not the output exists is judged depending on the structure table (1111). If the output data exists, the data having an event number identical to that of the data fetched in the step 1104 of FIG. 10(b) is searched in the buffer in the FC log area corresponding to the content code of the data and the obtained data is fetched into an area (1112). The processing steps 1110–1112 are repetitiously executed until there appears a program not having output data, namely, beginning from the program indicated in the start data, the data is sequentially stored in the system by effecting a check in the downstream direction. When there does not exist output data in the step 1111, the data stored in the area is expanded to the upstream and downstream directions with respect to the program indicated in the start data, thereby displaying the data on the CRT or outputting the data to the printer (FIG. 10(b), 1113). Next, the counter k is incremented by one (1114) and then the processing steps 1103–1114 are repetitiously executed until the value of k exceeds the number of data in the buffer corresponding to the content code of the input data of the start data program in the FC log area (1115).

Through the processing described above, the system can obtain the log data in which the data outputted by the lower stream programs initiated by the data outputed from the program specified in the start data of the program $EA_2$ and the data obtained in the upstream direction are related to each other.

In this embodiment, although the starting data of the program $EA_2$ is assumed to be keyed in from the CRT by the operator, the data of the format of FIG. 10(a) may be sent to the transmission line when the processor detects an abnormality in one of its programs. In this case, at the timing of the abnormality detection, the data logs for the upstream and the downstream with respect to the program for which an abnormality has been recognized can be obtained.

In this embodiment, for a module to be initiated by a plurality of data, the event number of each input data is assumed to be the same; however, the event numbers may be different from each other. In such a case, the processing need only be executed in the upstream direction for each event number and the contents of the processing are not changed.

Moreover, in addition to the parameter for the log of only the program information, the parameters such as for the logs of only the upstream, only the downstream, and up to the i-th items in the upstream and downstream directions may be set in the start data of the program $EA_2$, which makes it possible to attain the logging results of only the necessary portion of a sequence of the processing.

In this embodiment, although the data logging program is assumed to be installed in the processor 14, the program may be included in an arbitrary processor; furthermore, an arbitrary number of data logging programs may be installed.

While the embodiment of the data logging method of the present invention has been described, the present invention is not restricted by this embodiment, namely, when a program piece having an active function therein is treated by adding a content code thereto, the program piece can be handled in an information acquisition method in a similar fashion; consequently, the present invention is also applicable to the method in general for acquiring information and knowledge.

According to the present invention, the system can collect not only a simple time-series log, but also information and data log which are corresponding to the flow of a sequence of processing and further in which the input/output relationships are associated with each other. Moreover, by using this information, the troubleshooting can be effectively achieved, which improves the maintainability of the system.

[Second embodiment]

In the second embodiment of the present invention, each processor connected to the transmission path is provided with the following means: (1) for data received from an external input device, means for generating a message having a header field containing information (to be referred to as an event number) indicating the data receive order to receive data from that processor and the external device and a data field containing the content of the data received from the external device is provided and (2) for a message received from the transmission path, means for effecting a processing based on the content of the message and for relaying the header field content (event number) of the input message to the header field of a message to be outputted, as a result of the processing, to the transmission path.

Since different event numbers are set for the respective external input data (triggers) by use of these means (1) and (2), the message associated with the different triggers can be identified by judging the event number.

Figure 12:
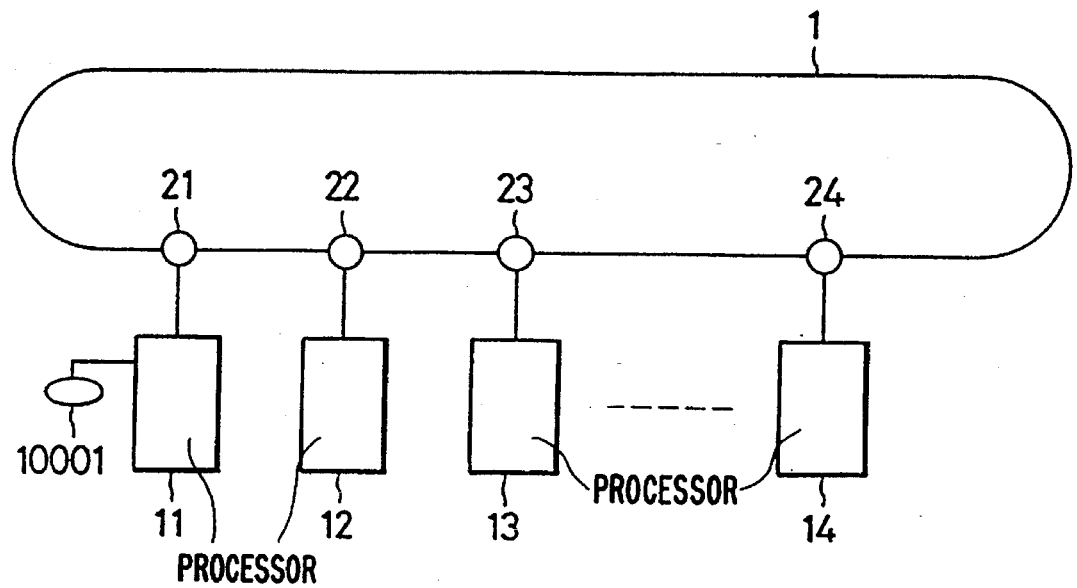
FIG. 12 is a schematic diagram illustrating the system configuration diagram of the system to which the present invention is applied.
Figure 13:
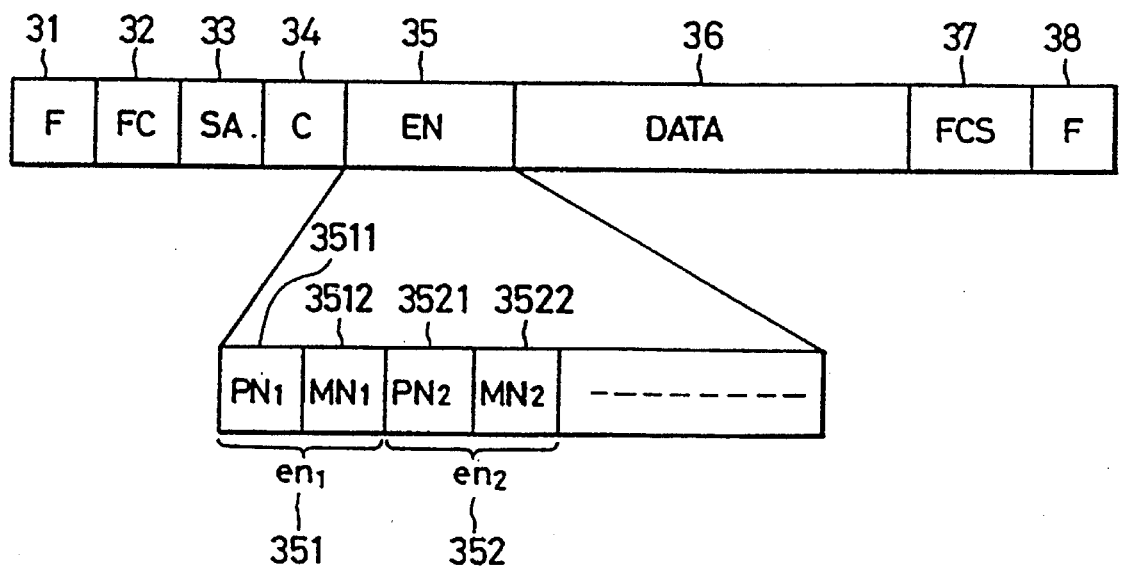
FIG. 13 is a schematic diagram showing a format of messages transmitted according to the present invention.

The second embodiment of the present invention will be next described with reference to FIGS. 11(a)–18. Referring now to FIG. 12–13, a description will be given of the configuration of a system to which the present invention is applied. In the following embodiment, although the common transmission line connecting the processors is described as a single loop transmission line, the processing is not changed even when a network of the double loop type, bus type, ring type, or a network in general with any transmission medium is used.

In FIG. 12, reference numerals 11–14 indicate processors like those in the first embodiment for storing application programs in the internal memories thereof for execution, a reference numeral 1 is a unidirectional loop transmission line for the transmission in the arrowed direction, and reference numerals 21–24 indicate network control processors (NCP's) for controlling the data transmission on the transmission line. Each of the NCP's 21–24 is bidirectionally connected to each of the processors 11–14. The processing results (messages) of the processors 11–14 are sent via the NCP's 21–24 for a judgement for whether or not a message passing through the transmission line is necessary for the processor connected thereto and sends the message to the processor if this is the case. Each of the processors 11–14 initiates the application program stored therein when all messages necessary to execute the application program are completely gathered. A started program executes the processing by use of the data and outputs a message as a result of the processing. Furthermore, in this embodiment, the processor 11 is assumed to be connected to an external input/output device 10001 to perform input/output operations with external device.

FIG. 13 shows the format of a message passing through the transmission line. FC 32 is a content code corresponding to the content and function of the data. Each NCP judges based on this content code whether or not the received data is necessary for the processor connected thereto. SA 33 is an address (source address) of an NCP that has issued the data and C 34 is a serial number necessary for the transmission. Data 36 indicates the content of the result of the processing executed by each application program, FCS 37 is data for an error detection, and F 31 and F 38 are flags respectively indicating the beginning and ending of message. Moreover, EN 35 is a serial number of the processing level set according to the present invention and is referred to herebelow as an event number. The event number area includes a predetermined number of processor numbers 3511, 3521, etc. and the same number of message generation serial numbers 3512, 3522, etc. Each pair (of en1 and 351, en2 and 352, etc.) of a processor number and a message generation number is assumed as a unit, which is referred to herebelow as an event number unit.

The internal configuration of each of the processors 11–14 of FIG. 12 is similar to that shown in FIG. 3 with the exception that when the external output device 10002 is unnecessary, the external output control unit 111 can be omitted.

Figure 14A:
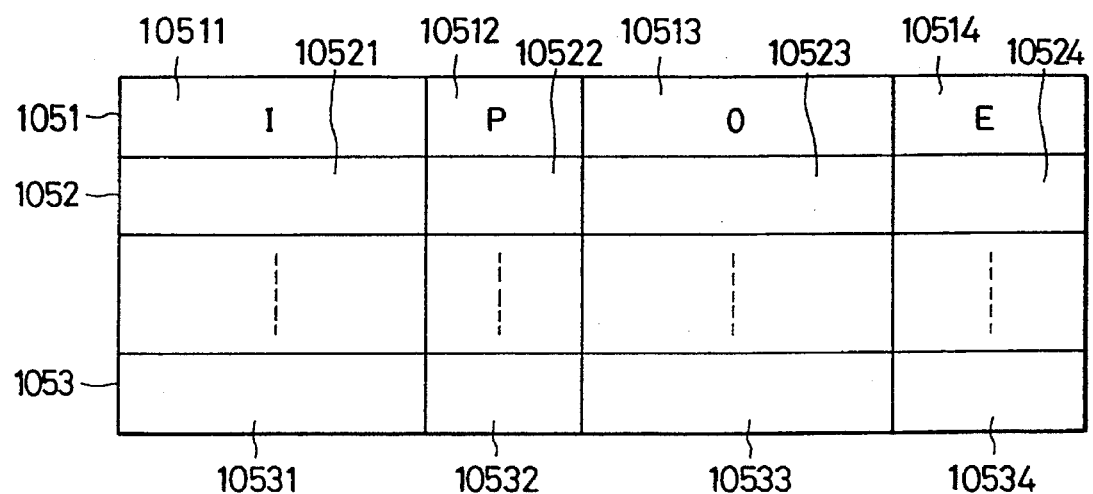
FIGS. 14(a)–14(b) are explanatory diagrams for explaining the table configurations.
Figure 14B:
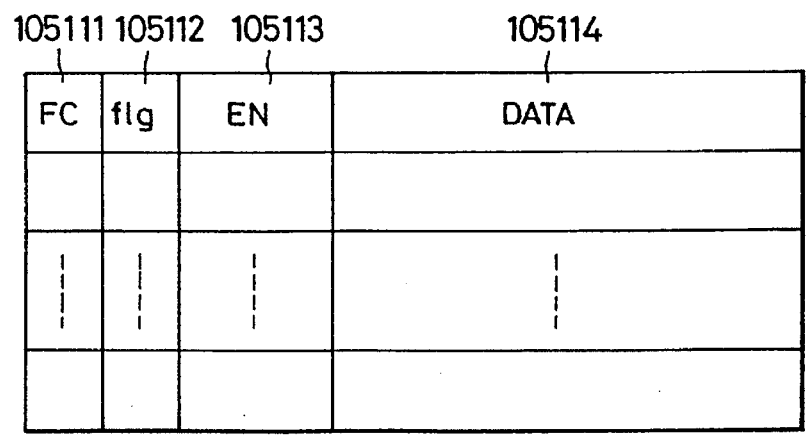

FIG. 14(a) shows the content of the input/output data storing area 105 of FIG. 3. The 1st row 1051 of this area is used to store the input/output messages associated with the application program 1081. Areas 10511 and 10513 store an input message and an output message, respectively. A starting program area 10512 indicates a program (i.e. 1081) to be started by the input message stored in the area 10511. An event number storing area 10514 stores in correspondence to the content codes of input messages the event numbers of the preceding input messages for as many as there are fields therefor, namely, in any situation, there are stored the predetermined number of event numbers of the input messages previously received beginning from the top of the event numer storing area 10514. Second row 1052 is an area to store input/output messages of the application program 1082. For the subsequent areas, the input/output storing areas are similarly allocated for each application program. FIG. 14(b) shows the format of the input message storing area 10511 of FIG. 14(a). To an area 105111, a content code of an input message has been set in advance. An area 105112 is used as a flag to indicate whether or not an input message has been stored, an area 105113 stores an event number, and an area 105114 stores the content of the data field of the message. In a case where an application program is started by a plurality of input messages, the areas 105111–105114 are allocated for each message. Incidentally, the output data storing area is of the same format.

Referring now to FIGS. 15–18, the replicated message processing method will be described according to the present invention.

FIG. 15 shows the processing flow when a message is inputted to the processing unit 104 of FIG. 3. On receiving a message from the receiving buffer 102 of FIG. 3, the processor first executes the replicated message processing according to the present invention (9601). Thereafter, it is checked to determine whether or not an executable application program exists, namely, whether or not all input messages necessary to execute the application program have been stored in the input/output data storing area 105 of FIG. 3 (9602). If such an executable program is not found, the processing is immediately finished. If an executable program exists, the content of the event number area EN of FIG. 14(b) in the input data storing area corresponding to the program is directly stored in the event number area EN in the output data storing area corresponding to the program (9603).

For an application program to be started by a plurality of input messages having different event numbers, the event number units set to the respective event number areas in the input messages are entirely set to the event number area in the output data storing area. However, if the total capacity of the event number units of the input messages exceeds that of the event number area, the processing is executed according to a predetermined standard, for example, to delete the event number units beginning from the event number unit having the smallest serial number. After the processing 9603 is finished, the executable program is started (9604). Moreover, after the program execution is completed, the content of the flg field (FIG. 14(b)) in the input data storing area is reset.

The started application program executes the processing by use of the input message, sets the processing result into a data field (Data) of the output data storing area, and sets 1 to the flag indicating that the data has been set. In addition, if the data has been set to the Data field of the output data storing area, the processor sets the contents of the FC, EN, and Data fields to the pertinent areas of the sending buffer 103 of FIG. 3.

FIG. 16 is a diagram showing the processing flow of the external input control unit. At an occurrence of an external input, the external input control unit 109 of FIG. 3 judges the content code of the input data depending on the external input FC corresponding table 110 of FIG. 3 and sets to the sending buffer 103 of FIG. 3 the external input data, the content thereof, and a content code judged depending on the external input FC corresponding table (9701, 9702). Next, based on the contents of the processor number area 106 of FIG. 3 and the serial number area 107 of FIG. 3, an event number unit is generated and is set into the sending buffer as an event number of the output message (9703). Thereafter, the content of the serial number area is incremented by one (9704).

FIG. 17 is a diagram showing a concrete processing flow of the replicated message processing 9601 of FIG. 15. The system judges whether or not the event number in the message received from the receiving buffer matches the event number of a previous message which has a content code identical to that of the objective message (9801). More concretely, the input/output data storing area (FIG. 14(*a*)) is searched to find a row in which a code equal to the content code of the message just received is set into the FC field of the input data storing area (FIG. 14(*b*)). Thereafter, the system judges whether or not the value of the event number of the message just received is stored in the event number storing area of the obtained row. If this is the case, since the message just inputted is redundant with respect to a previously inputted message, the processing is immediately finished without setting into the input data storing area the message received from the receiving buffer (9802). Namely, the message is omitted because of its redundancy with respect to the previously received message. On the other hand, if such a message satisfying the matching condition is missing, the message is assumed to be received for the first time, and hence the contents of the event number field (EN) and the data field (Data) of this message are set into the EN and Data fields of the input data storing area (FIG. 14(*b*)) to which the content code of the pertinent message is set. Moreover, one is set into the flg field (9803). Next, the content of the event number of the input message just received is added as an event number of the latest message to the event number storing area of the input/output data storing area. In this case, if the number of the stored event numbers exceeds the predetermined number, the oldest event number is deleted from those previously stored (9804).

The replicated message processing of the present invention is achieved through the processing described above. The overall flow of the processing will be described with reference to FIGS. 11(*a*)–11(*b*). FIG. 11(*a*) is a diagram showing the system configuration and the processing flow in which the system configuration is the same as that of FIG. 2. It is assumed that application programs 108, 108', and 108''' 108" are incorporated in the processors 11–14, respectively and that the programs 108' and 108" of the processors 12 and 13, respectively are completely the same. Assume here that the processor 11 receives data from the external input device 10001. The processor 11 sets a content code FC, and an event number $EN_1$ to the data from the external input device, generates a message 9001 in the format of FIG. 11(*b*), and sends the message to the transmission line 1. Incidentally, the format conforms to that shown in FIG. 13. The processor 12 receives the message 9001 and then starts its application program 108', which executes its processing by use of the message 9001 and outputs as a result the DATA 2 and content code $FC_2$. The processor adds the event number $E_1$ of the input message 9001 to the $FC_2$ and DATA 2 outputted from the application program, generates a message 9002 of the format shown in FIG. 11(*b*), and sends the message to the transmission line 1. The processor 13 also receives the message 9001 in a completely similar manner as that of the processor 12, starts its own application program 108", generates as a result a message 9003, and sends the message to the transmission line 1. In this case, since the application programs 108'–108" are completely the same, the respective output messages include the same content code $FC_2$ and the same content DATA 2 of the data field. Moreover, since these programs are started by the message 9001, the output messages include the event number $EN_1$. Namely, the messages 9002–9003 are replicated messages according to the present invention. Assume now that the message 9003 is first received by the processor 14. The processor 14 then receives the message 9003 and starts its application program 108'''. Next, assume that the message 9002 is received by the processor 14. The processor 14 then receives the message 9002; however, since the content code $FC_2$ and the event code $EN_1$ of this message match with those of the previously received message 9003, this message is omitted without being used. In a case where the message 9002 first reaches the processor 14, the message 9003 later received is contrarily omitted in the similar processing.

As described above, according to the present invention, when a plurality of redundant messages occur in the transmission system, each processor can execute its own processing when one of the replicated messages is first received; moreover, it is possible to ignore the subsequent replicated messages after this point.

Figure 18:
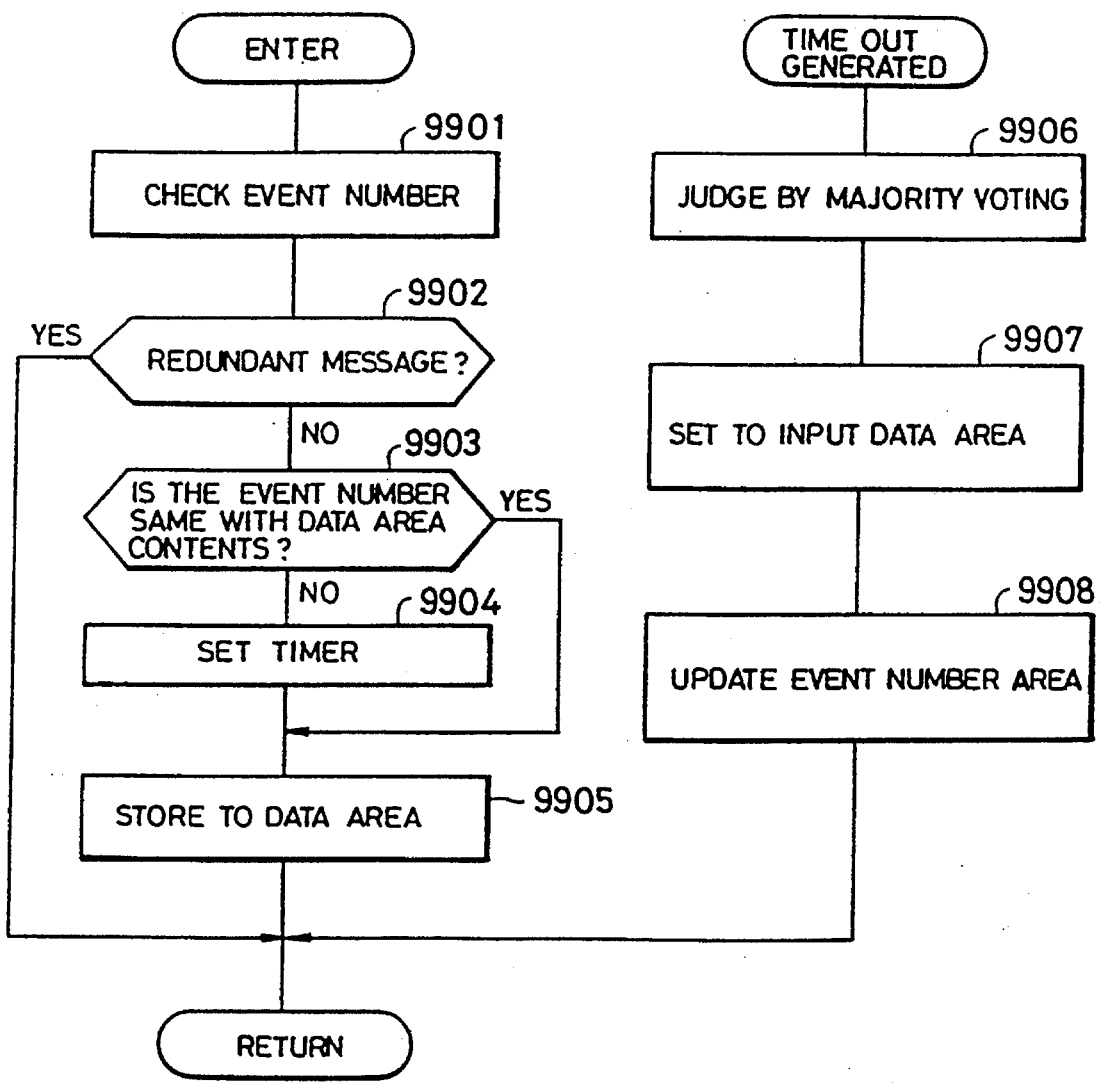

The method described above selects only one message from the replicated messages according to the receiving order of the messages. In contrast, each processor may be provided with a timer and a redundant message storing area; furthermore, a majority decision judging logic may be incorporated in the replicated message processing section of the step 9601 of FIG. 15, so that the replicated messages are collected and a message to be used is selected according to the majority decision logic. More concretely, FIG. 18 shows the flow of the processing corresponding to the step 9601 of FIG. 15. The processor effects an event number check for the message received from the receiving buffer based on the event number storing area of FIG. 14(*a*) (9901). This processing is the same as that of the step 9801 of FIG. 17. As a result of the check in the step 9901, if a redundant message is found, the processing is immediately finished. As a result of the check in the step 9901, if the message is found to be other than a redundant message, the system judges whether or not the event number of the message matches with that of the message already collected in the data storing area (9903). If they match with each other, the message is directly stored in the data storing area (9905); otherwise, the timer is set (9904) and then the message is stored in the data storing area (9905). Furthermore, at a point of time when the timer set in the step 9904 indicates a time-out, a majority decision judgement is conducted among the corresponding redundant judgement in the redundant message storing area (9906). The selected message is set into the input data storing area (9907) and the event number of the message is set into the event number storing area (9908). The processing steps 9907–9908 are identical to the steps 9803–9804 of FIG. 17.

In this method, although the majority decision judgment is effected at a timing of an occurrence of a time-out, it is also possible to conduct the majority decision judgment at a timing when a predetermined number of redundant messages are collected.

In a case where the majority decision judging method described above is used, if at least three processors executing the same processing are provided, a processor causing an occurrence of an abnormality message can be specified.

According to the present invention, each processor connected to the network identifies redundant messages among those passing through the network and is enabled to select one of the redundant messages based on its own logic, thereby executing its processing. Consequently, by incorporating the method of the present invention in each processor constituting the distributed processing system, arbitrary processors can be replicated according to an arbitrary degree of replication, thereby allowing the free running of the processors, which greatly improves the nonstop characteristic and reliability of the system.

We claim:

1. A distributed processing method in a system, including a plurality of processors connected via a transmission path for processing data carried in messages by transmission of successive messages through the system, each transmission of a message through the system representing an event of processing by the system, comprising the steps of:

sending from a first sending processor to the transmission path a first message including first data, a first event number providing information identifying an event of processing of the first data by said plurality of processors, and a content code indicating the content of the first data;

sending from a second sending processor to the transmission path a second message including second data, a second event number providing information identifying an event of processing of the second data by said plurality of processors, and a content code indicating the content of the second data;

receiving in at least one receiving processor one of the first and second messages flowing through the transmission path, said at least one receiving processor having content codes for indicating data to be stored therein;

storing in said receiving processor data from the received message when the content code contained in said received message corresponds to a content code of the receiving processor and processing said stored data in the receiving processor;

sending from said one receiving processor to said transmission path an output message containing data representing a result of the processing of the data stored in said receiving processor and the received event number; and identifying in a further processor receiving said first and second messages, histories of processing flows based on said first and second messages, each of said histories corresponding to one of said first and second event numbers in the received first and second messages.

2. A distributed processing method according to claim 1, wherein said identifying step comprises the steps of:

storing the data in said first and second messages by said further processor with reference to the content codes in the received messages; and establishing a set of processing flow related to the stored data for the content code and programs in each processor, to be included in one of said histories of the corresponding.

3. A distributed processing method according to claim 2, wherein said method further comprises a step of:

trouble shooting said system using messages received by the further processor using at least one of said first and second event numbers and said content codes in said messages.

4. A distributed processing method for processing data in selected processors, in a system including a plurality of processors connected via a transmission path, by sending said data in messages on said transmission path to said processors, each transmission of a message through the system representing an event of processing by the system, wherein processing for each of said processors comprises the steps of:

independently generating a first message containing first data and a first event number providing information identifying an event of processing of the first data by the system;

sending the generated first message to said transmission path;

independently generating a second message containing second data and a second event number providing information identifying an event of processing of the second data by the system;

sending the generated second message to said transmission path;

receiving one of the first and second messages as they flow through the transmission path;

independently performing a processing on the data in the received message to produce processed data; and sending out the processed data on said transmission path in an output message which includes the same event number as included in the received message so that a history including the performed processing can be identified, said history corresponding to said same event number.

5. A distributed processing method according to claim 4, wherein said method further comprises the steps of:

receiving in at least one further processor, said first and second messages flowing through the transmission path; and storing the received data of said first and second messages with reference to each of said first and second event numbers.

6. A distributed processing method in a system including a plurality of processors connected via a transmission path for processing data carried in messages by transmission of successive messages through the system, each transmission of a message through the system representing an event of processing by the system, comprising the steps of:

sending from a first sending processor to the transmission path a first message including first data, first information for identifying an order related to an event of processing in said first sending processor and a content code indicating the content of the first data;

sending from a second sending processor to the transmission path a second message including second data, second information for identifying an order related to an event of processing in said second sending processor and a content code indicating the content of the second data;

receiving in a receiving processor one of said first and second messages as they flow on said transmission path, said receiving processor having content codes identifying data to be stored therein;

storing in said receiving processor data in the received message which has a content code corresponding to a content code of the receiving processor;

sending an output message from the receiving processor containing a result of processing of stored data, based upon one of the first and second information contained in the received message;

receiving in at least one further processor said first, second and output messages from said transmission path; and identifying in said further processor histories of processing sequences, based upon said first, second and output messages, each of said histories corresponding to one of said first and second information.

7. A distributed processing method according to claim 6, wherein said identifying step comprises:

storing in said further processor the data in said first, second and output messages with reference to the content codes in the received messages; and establishing a set of processing flow related to the stored data for the content code and programs in each processor, to be included in one of said histories of the corresponding information.

8. A distributed processing method according to claim 6, further comprising the step of:

trouble shooting said processors using messages received by said further processor in accordance with said content codes and at least one of said first and second information in said received messages.

9. A distributed processing method in a system including a plurality of processors connected via a transmission path for processing data carried in messages by transmission of successive messages through the system, each transmission of a message through the system representing an event of processing by the system, wherein processing by said processors comprises the steps of:

independently generating in a first processor a first message containing data and a first event number indicating an order in which the message is generated by said first processor to initiate an event of processing in the system;

sending the generated first message to said transmission path from said first processor;

independently generating in a second processor a second message containing data and a second event number indicating an order in which the message is generated by said second processor to initiate an event of processing in the system;

sending the generated second message to said transmission path from said second processor;

receiving in another processor one of said first and second messages as they flow on said transmission path; performing processing on the data in the received message; and sending from said another processor to said transmission path an output message containing a result of processing of data contained in the received message and the same event number as contained in that received message, so that a history of a process flow including the performed processing can be identified, said history corresponding to said same event number.

10. A distributed processing method according to claim 9, in which said system further includes an analysis processor connected to said transmission path, said analysis processor performing the steps of:

receiving at least one of said first and second messages from said transmission path; and identifying an order of sets of the processes within a history of processing sequence in said system using at least one of said first and second event numbers in said received messages.

11. A distributed processing method in a system including a plurality of processors connected via a transmission path for processing data carried in messages by transmission of successive messages through the system, each transmission of a message through the system representing an event of processing by the system, comprising the steps of:

(a) sending from a first processor to said transmission path a first message containing data, a first content code indicating the content of the data and a first event number for identifying an event of processing of the data in the system;

(b) sending from a second processor to said transmission path a second message containing data, a second content code indicating the content of the data and a second event number for identifying an event of processing of the data in the system;

(c) receiving in a first receiving processor one of said first and second messages as they flow through the transmission path and processing the data in the received message;

(d) sending to said transmission path from said first receiving processor a first output message containing a result of processing of the data in said received message, a third content code and the same event number as contained in said received message;

(e) receiving in a second receiving processor one of said first and second messages as they flow through the transmission path and processing the data in the message received by the second receiving processor;

(f) sending to said transmission path from said second receiving processor a second output message containing a result of processing the data in the message received by said second receiving processor, a third content code and the same event number as contained in the message received by said second receiving processor;

(g) repeating steps (a) through (f) a predetermined number of times so as to place plural first and second output messages on said transmission path; and (h) analyzing in an analyzing processor, receiving said first and second messages from said transmission path, and identifying processing flows in histories of processing sequence within the system on the basis of the content codes and event numbers contained in the output messages, each of said histories corresponding to one of said first and second event numbers.

12. A distributed processing method according to claim 11, wherein said step (h) comprises:

(h1) storing the data in said first and second output messages according to the content codes in the output messages; and (h2) establishing a set of processing flow related to the stored data for the content code and programs in each processor, for obtaining information corresponding to said histories of the corresponding event numbers.

13. A distributed processing system for processing data carried in messages by transmission of successive messages through the system, each transmission of a message through the system representing an event of processing by the system, comprising:

a plurality of processors connected via a transmission path;

means in a first sending processor for sending to the transmission path a first message including first data, a first event number providing information identifying an event of processing of the first data, and a content code indicating the content of the first data;

means in a second sending processor for sending to the transmission path a second message including second data, a second event number providing information identifying an event of processing of the second data, and a content code indicating the content of the second data;

means for receiving in at least one receiving processor one of the first and second messages as they flow through the transmission path, said at least one receiving processor having content codes for indicating data to be stored therein;

means for storing in said receiving processor data from the received message in accordance with the content code contained in said message and processing said stored data;

means for sending from said one receiving processor to said transmission path an output message containing data representing a result of the processing of the data stored in said receiving processor and the received event number; and means for identifying processing flows based on said first and second messages, each of said histories corresponding to one of said first and second event numbers in the received first and second messages.

14. A distributed processing system according to claim 13, wherein said identifying means comprises:

means for storing the data in said first and second messages by said further processor with reference to the content codes in the received messages; and means for establishing a set of processing flow related to the stored data for the content code and programs in each processor, to be included in one of said histories of the corresponding event number.

15. A distributed processing system according to claim 13, wherein said system further comprises:

means for trouble shooting said system using messages received by the further processor in accordance with at least one of said first and second event numbers and said content codes in said messages.

16. A distributed processing system for processing data in selected processors, including a plurality of processors connected via a transmission path, by sending said data in messages on said transmission path to said processors, each transmission of a message through the system representing an event of processing by the system, wherein each of said processors comprises:

means for independently generating a first message containing first data and a first event number providing information identifying an event of processing of the first data;

means for sending the generated first message to said transmission path;

means for independently generating a second message containing second data and a second event number providing information identifying an event of processing of the second data;

means for sending the generated second message to said transmission path; and means for receiving one of the first and second messages as they flow through the transmission path;

means for independently performing processing on the data in the received message to produce processed data; and means for sending out the processed data on said transmission path in an output message which includes the same event number as included in the received message, so that a history of a process flow including the performed processing can be identified, said history corresponding to said same event number.

17. A distributed processing system according to claim 16, further comprising:

means for receiving in at least one further processor, said first and second messages flowing through the transmission path; and means for storing the received data of said first and second messages with reference to each of said first and second event numbers.

18. A distributed processing system for processing messages, including a plurality of processors connected via a transmission path, for processing data carried in messages by transmission of successive messages through the system, each transmission of a message through the system representing an event of processing by the system, comprising:

means in a first sending processor for sending to the transmission path a first message including first data, first information for identifying an event of processing in said system and a content code indicating the content of the first data;

means in a second sending processor for sending to the transmission path a second message including second data, second information for identifying an event of processing in said system and a content code indicating the content of the second data;

means for receiving in a receiving processor one of the first and second messages as they flow on said transmission path, said receiving processor having content codes identifying data to be stored therein;

means for storing in said receiving processor data in the received message which has a content code corresponding to a content code of the receiving processor;

means for sending an output message from the receiving processor containing a result of processing of stored data, based upon one of the first and second information contained in the received message;

means for receiving in at least one further processor, said first, second and output messages from said transmission path; and means for identifying in said further processor histories of processing sequences based upon said first second and output messages, each of said histories corresponding to one of said first and second event numbers.

19. A distributed processing system according to claim 18, wherein said identifying means comprises:

means for storing in said further processor the data in said first, second and output messages with reference to the content codes in the received messages; and means for establishing a set of processing flow related to the stored data for the content code and programs in each processor, to be included in one of said histories of the corresponding information.

20. A distributed processing system according to claim 18, further comprising:

means for trouble shooting said processors using messages received by said further processor in accordance with said content codes and at least one of said first and second information in said received messages.

21. A distributed processing system, including a plurality of processors connected via a transmission path for processing data carried in messages by transmission of successive messages through the system, each transmission of a message through the system representing an event of processing by the system, wherein each of said processors comprises:

means for independently generating a first message containing data and a first event number indicating an order in which the message is generated by a first processor to initiate an event of processing in said system;

means for sending the generated first message to said transmission path;

means for independently generating a second message containing data and a second event number indicating an order in which the message is generated by a second processor to initiate an event of processing in said system;

means for sending the generated second message to said transmission path;

means for receiving one of said first and second messages as they flow on said transmission path and performing processing on the data in the received message; and means for sending to said transmission path an output message containing a result of the processing of data contained in the received message and the same event number as contained in that received message, so that a history of a process flow including the performed processing can be identified, said history corresponding to said same event number.

22. A distributed processing system according to claim 21, which further includes an analysis processor connected to said transmission path, said analysis processor including:

means for receiving at least one of said first and second messages from said transmission path; and means for identifying an order of sets of processes within a history of processing sequence in said system according to at least one of the first and second event numbers in said received messages.

23. A distributed processing system, including a plurality of processors connected via a transmission path for processing data carried in messages by transmission of successive messages through the system, each transmission of a message through the system representing an event of processing by the system, comprising:

means in a first processor for sending to said transmission path a first message containing data, a first content code indicating the content of the data and a first event number for identifying an event of processing of the data in the system;

means in a second processor for sending to said transmission path a second message containing data, a second content code indicating the content of the data and a second event number for identifying an event of processing of the data in the system;

means for receiving in a first receiving processor one of said first and second messages as they flow through the transmission path and for processing the data in the received message;

means for sending to said transmission path from said first receiving processor a first output message containing a result of processing of the data in the message received by said first receiving processor, a third content code and the same event number as contained in the message received by said first receiving processor;

means for receiving in a second receiving processor one of said first and second messages as they flow through the transmission path and for processing the data in the received message;

means for sending to said transmission path from said second receiving processor a second output message containing a result of processing the data in the message received by the second receiving processor, a fourth content code and the same event number as contained in the message received by the second receiving processor; and means in an analyzing processor for receiving from said transmission path said first and second output messages and for identifying processing flows in histories of processing sequence within the system on the basis of the content codes and event numbers contained in the received output messages, each of said histories corresponding to one of said first and second event numbers.

24. A distributed processing system according to claim 23, wherein said means in said analyzing processor further comprises:

means for storing the data in said plural first and second output messages according to the content codes in said output messages; and means for establishing a set of processing flow related to the stored data for the content code and programs in each processor, for obtaining information corresponding to said histories of the corresponding event numbers.

25. A distributed processing system according to claim 23, comprising:

means for receiving in at least one receiving processor said first and second messages, and said first and second output messages from said transmission path; and means for respectively comparing in said one receiving processor the content code and the event number in a received message with the content code and event number of a previously received message to detect replicated messages having the same content code and event number, for identifying a history of a process flow including processes of said received message and said previously received message, said history corresponding to said event number.

26. A distributed processing system having a plurality of processor connected via a transmission path for processing data carried in messages by transmission of successive messages through the system, each transmission of a message through the system representing an event of processing by the system, comprising:

means for sending to said transmission path from a sending processor messages containing data, a first event number identifying an event of processing of the data by the system and a content code indicating the content of the data;

means for sending to said transmission path from a sending processor messages containing data, a second event number identifying an event of processing of the data by the system and a content code indicating the content of the data;

means for receiving in a plurality of receiving processors messages flowing on the transmission path and processing in said receiving processors the data contained in the received messages;

means for sending to said transmission path from each of said receiving processors a message containing a result of processing of data contained in the received message, a content code which is different from the content code in the received message and an event number which is the same as the event number in the received message; and means for respectively comparing in a receiving processor the content code and the event number of a received message with the content code and the event number of a previously received message to detect replicated messages having the same content code and event number, for identifying a history of a process flow including processes of said received message and said previously received message, said history corresponding to said event number.

* * * * *